United States Patent [19]

Yang et al.

[11] Patent Number: 5,106,501
[45] Date of Patent: Apr. 21, 1992

[54] MULTI-FUNCTION FILTER CARTRIDGE WITH FLOW DISTRIBUTION CONTROL

[75] Inventors: Vue X. Yang; Gary L. Hatch; Thomas D. Holler, all of Sheboygan, Wis.

[73] Assignee: Ametek, Inc., Sheboygan, Wis.

[21] Appl. No.: 764,049

[22] Filed: Sep. 23, 1991

Related U.S. Application Data

[63] Continuation of Ser. No. 464,872, Jan. 16, 1990, abandoned.

[51] Int. Cl.⁵ ............................................. B01D 27/14
[52] U.S. Cl. ................................... 210/266; 210/282; 210/315; 210/437; 210/457; 210/489; 210/497.01
[58] Field of Search ........ 210/266, 282, 315, 437–440, 210/443, 456, 457, 489, 492, 497.01

[56] References Cited

U.S. PATENT DOCUMENTS

| | | | |
|---|---|---|---|
| 3,289,847 | 12/1966 | Rothemund | 210/266 |
| 3,375,933 | 4/1968 | Rodman | 210/502 |
| 4,032,457 | 6/1977 | Matchett | 210/489 |

*Primary Examiner*—Ivars Cintins
*Attorney, Agent, or Firm*—Andrus, Sceales, Starke & Sawall

[57] ABSTRACT

A composite cartridge type filter of the kind utilizing a hollow cylindrical body of bonded activated carbon and an interior filled with a particulate filter media bed is disposed within a housing such that raw unfiltered water passes radially inwardly through the carbon body, into the interior media bed and then axially through the media bed to an outlet in one end. To balance the radial flow of water through the carbon body and maximize contact with the particulate media bed, a flow distribution device is disposed in the interface between the carbon body and the particulate filter media bed to distribute a portion of the flow toward the end of the media bed which is remote from the cartridge outlet. In this manner, short circuiting of the water through the filter is eliminated, radial flow through the carbon body is balanced, and a substantial portion of the flow is forced to follow a path which carries it through substantially the full length of the particulate media bed.

31 Claims, 3 Drawing Sheets

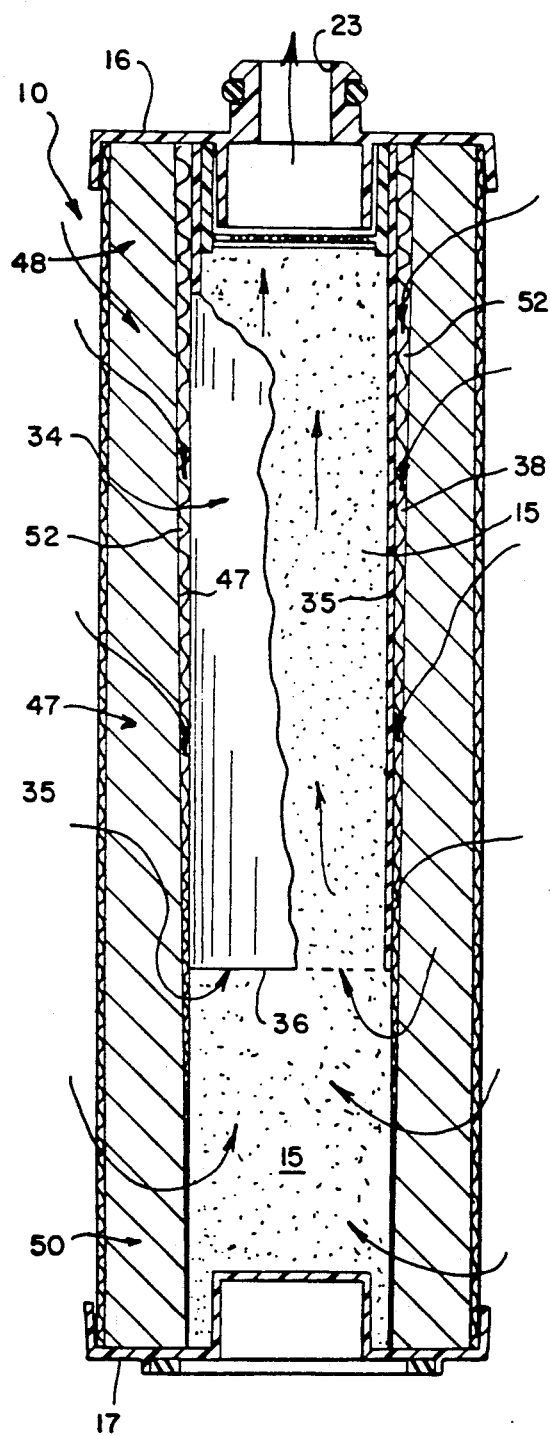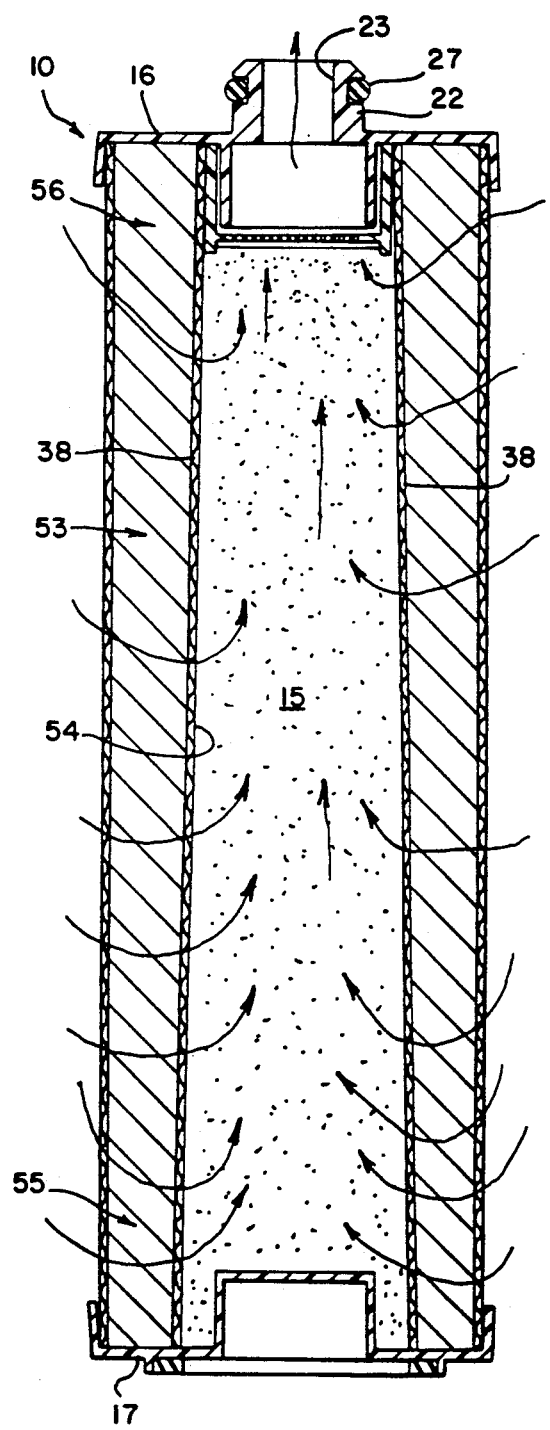

MULTI-FUNCTION FILTER CARTRIDGE WITH FLOW DISTRIBUTION CONTROL

This is a continuation of application Ser. No. 07/464,872, filed Jan. 16, 1990, now abandoned.

BACKGROUND OF THE INVENTION

The present invention relates to a filter for removing dissolved solids and other contaminants from water and, more particularly, to a cartridge filter having either a single solid filter through which a balanced flow is attained or dual concentric filter media through which serial radial and axial flow is controlled and balanced by a flow distribution apparatus between the two filter media.

Small cylindrical tubular filters utilizing various types of filter media useful in treating domestic water supplies are well known in the art. Activated carbon has been widely used because of its ability to absorb and filter a wide range of dissolved and suspended solids, as well as dissolved gases. To alleviate the problem of handling and retaining powdered activated carbon filter material, porous blocks of resin-bonded powdered activated carbon have been developed. In one embodiment, porous carbon filter blocks are formed in a long cylindrical shape with a hollow axial interior. Such a cylindrical filter block is placed in a suitable housing and raw water to be filtered is supplied in a manner to cause it to flow radially inwardly through the porous filter block to the hollow interior from which it is collected for use from one open end. It is also known to fill the hollow interior of the cylindrical block with another filter media in particulate form to provide supplemental filtration or water treatment.

U.S. Pat. No. 3,289,847 (Rothemund) shows a dual bed filter comprising a hollow cylindrical outer filter having its interior filled with a different type of particulate filter material. Activated carbon and an ion exchange resin are disclosed for use in two concentric filter beds. U.S. Pat. No. 4,032,457 (Matchett) discloses a tubular cylindrical filter cartridge containing activated carbon in a bonded matrix. In one embodiment, the hollow interior of the cartridge may be filled with a particulate ion exchange resin. U.S. Pat. No. 3,375,933 (Rodman) shows a cylindrical tubular filter module comprising activated carbon particles encapsulated in a polymer resin matrix. It also discloses a similar filter module comprising a powdered ion exchange resin similarly bonded with a suitable polymer. The use of a mixture of cation and anion exchange resins is also disclosed.

Resin-bonded powdered activated carbon filter blocks have gained widespread use in drinking water filter systems. Activated carbon is known to be effective for the removal of a wide range of dissolved and suspended solids, including metals and other dissolved minerals, colloidal and other suspended solids, dissolved gases, and even bacteria. As indicated, it is also known to combine other filter materials and media with porous activated carbon blocks to provide series filtration for materials which cannot be removed by the carbon or whose removal in a carbon filter is not particularly effective. For example, the interior of a hollow cylindrical carbon block filter may be filled with a wide variety of particulate filter media including minerals, resins or metals, in either finely divided or granular form. Mixtures of different types of filter media may also be utilized.

A porous carbon block filter formed with a hollow cylindrical body provides a relatively high filter capacity with a relatively small volume of filter material, and a corresponding low resistance to liquid flow through it. However, in order to provide optimum treatment capability and maximum life, it is most desirable that the radial flow of water or other liquid through the cylindrical outer wall be evenly distributed along its full axial length. Unfortunately, in the manner in which these filters are commonly used, with the radial flow into the hollow interior directed axially to one open outlet end, there is a tendency for the radial flow to be short circuited through the end of the body closest to the outlet. As a result, much of the axial length of the filter body may not be effectively utilized or utilized at all, the larger volume of liquid flow concentrated in a small filter area may not be adequately treated, and tests of the effluent from the filter may indicate failure or exhaustion of the media.

In a typical filter cartridge construction utilizing a hollow cylindrical carbon block having its open interior filled with another filter media, a similar problem concerns the difficulty in obtaining uniform radial flow through the carbon block and subsequent maximized axial or column flow through the interior media bed. For example, one commonly used filter cartridge is adapted to be installed in a housing in which both the raw water inlet and the filtered water outlet are located in the cover for the housing. In this construction, as in the application utilizing a hollow cylindrical carbon block filter alone, there is a tendency for the incoming water to short circuit and take the most direct route radially through the end of the carbon block immediately adjacent the inlet and then axially through only a short length of the media bed to the filtered water outlet. Short circuiting of the flow prevents the most effective use of the entire filter cartridge, particularly those portions at the opposite axial end remote from the inlet and/or outlet. The above identified patent to Matchett recognizes this problem in a filter cartridge of the type having an inlet in one end and the outlet in the other end. However, in order to reduce short circuiting, radial flow through a portion of the length of the outer tubular filter is substantially restricted or eliminated. The problem of short circuiting becomes more acute in certain situations, such as those applications in which the interior media bed comprises an ion exchange resin, where sufficient residence time of the water is critically important to effect the desired ion exchange. Thus, nonuniform flow distribution and short circuiting of the water not only results in inefficient use of the interior filter media bed, but may also substantially diminish the filtering or absorption capability of the carbon body.

The problem of short circuiting and lack of adequate axial distribution of the radial flow through a hollow cylindrical carbon block filter are also common to other filters having the same generally rigid self-supporting body of the same shape, but having a different type of porous filter medium. Thus, hollow cylindrical filter bodies may also be constructed of materials such as ceramics, resin bonded cellulose, bonded fibers, and a variety of other bonded particulates.

SUMMARY OF THE INVENTION

The present invention is directed to a filter apparatus of the type using a cartridge comprising a cylindrical body of bonded activated carbon particles or other self-supporting medium having a hollow generally cylindrical interior which may be filled with another particulate filter media. The cartridge is constructed to be positioned within an outer housing such that the liquid to be filtered flows radially through the carbon body from the outside to the open interior, into the interior particulate media bed if present, and then axially through the media bed or hollow interior to a filtered water outlet at one open end of the hollow cylindrical body.

In accordance with the present invention, a flow distribution means is disposed along the carbon body between the open outlet end and the opposite end to distribute the water or other fluid passing through the carbon body axially therealong to help eliminate short circuiting, distribute the flow uniformly through the filter body, and maximize the capacity of the filter body. In the preferred embodiment, the flow distribution means includes means for better distributing and equalizing the radial flow through the carbon body along its full axial length. The flow distribution means may specifically comprise a cylindrical tubular barrier which surrounds a portion of an interior media bed and extends axially from the open end of the cartridge and terminates in an opposite end portion which defines an open area adjacent the opposite end of the media bed remote from the cartridge opening. The tubular barrier has an outer surface which is spaced from the cylindrical interior surface of the carbon body such that water flowing radially through the carbon filter body will flow axially along the surface of the tubular barrier and into the media bed via the open area at the opposite end. The radial flow distributing means may comprise any suitable construction for the carbon body which provides a radial flow capacity that varies axially along the length of the body from a maximum adjacent the outlet end and along the tubular barrier to a minimum adjacent the remote end of the media bed. Suitable carbon body construction includes an axially varying density or wall thickness or a combination of both. Preferably, the tubular barrier comprises an impervious cylindrical sleeve having an opposite end portion which terminates spaced from the remote end of the media bed. In this embodiment, the tubular sleeve preferably has an axial length in excess of one-half the length of the filter cartridge.

In another embodiment, the tubular barrier is eliminated. Short circuiting is minimized and balanced flow distribution is accomplished by varying the radial flow capacity through the carbon body axially along its length in a manner opposite the preferred embodiment, i.e. varying the radial flow capacity from a minimum adjacent the outlet end to a maximum adjacent the remote end of the media bed. The axial variation in radial flow capacity counters the inherent tendency toward short circuiting, resulting in better balanced radial flow along the full length of the filter body. The variation in flow may likewise be provided with a carbon body that has either an axially varying porosity or wall thickness or a combination thereof. Alternately, a previous tubular member may be placed between the carbon body and the media bed (if present), which tubular member has a uniformly varying porosity along its length from a minimum adjacent the outlet to a maximum adjacent the remote end.

BRIEF DESCRIPTION OF THE DRAWINGS

FIG. 4 is a view similar to FIG. 2 showing a variation in the filter cartridge of the preferred embodiment.

FIG. 5 is an axial sectional view through the filter cartridge of an alternate embodiment.

DETAILED DESCRIPTION OF THE PREFERRED EMBODIMENT

Figure 1:
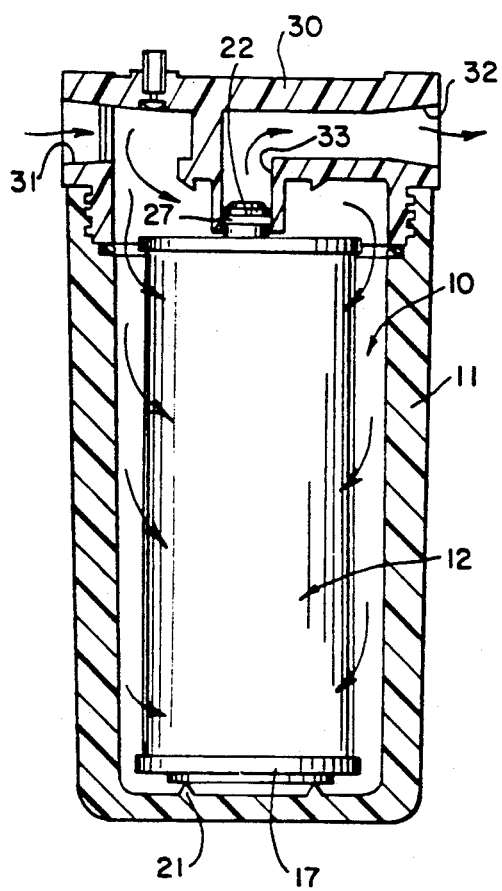
FIG. 1 is a sectional view showing the general arrangement of the filter cartridge of the present invention inside its housing.
Figure 2:
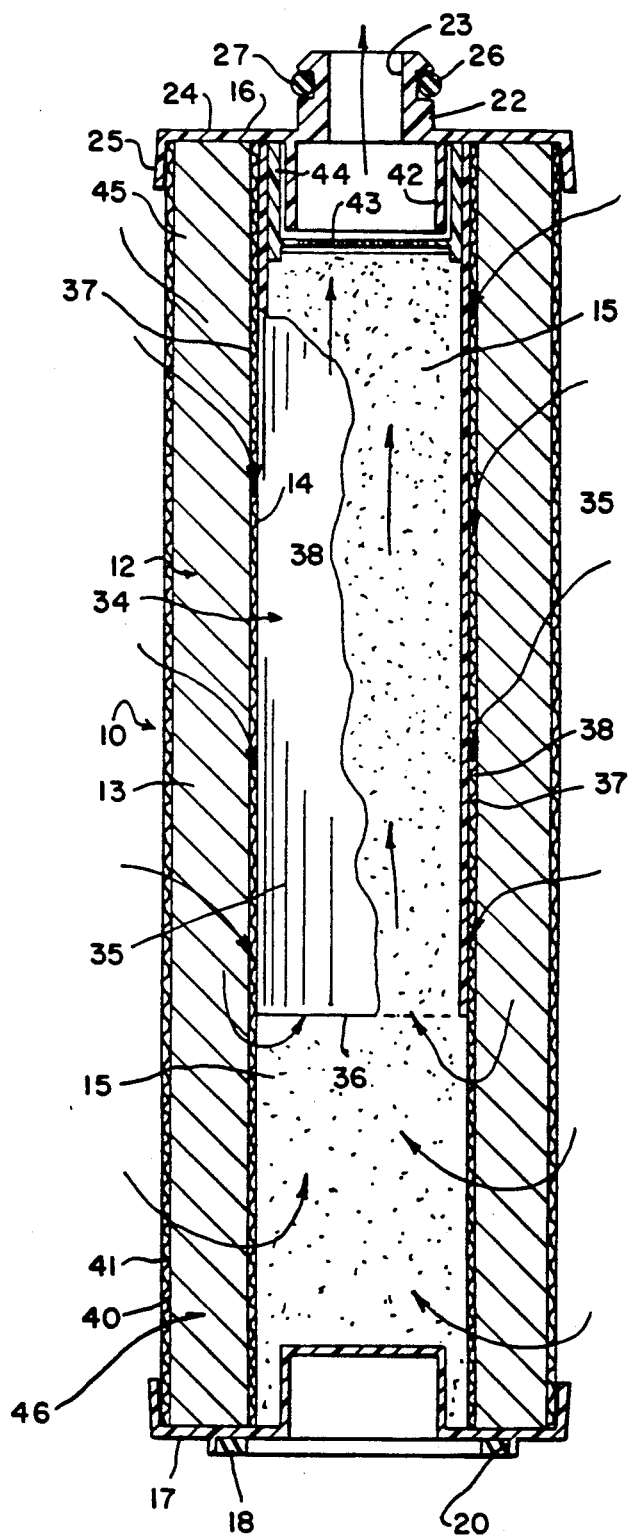
FIG. 2 is an axial sectional view through the filter cartridge of the preferred embodiment of the present invention.

Referring initially to FIGS. 1 and 2, a filter cartridge 10 of the present invention is adapted to be inserted into an enclosing filter housing 11 from which it may be removed and disposed of after reaching its effective life. It is understood, however, that a similar cartridge construction could be provided which is permanently sealed in a housing such that the entire unit is discarded after exhaustion. The filter cartridge 10 is of composite construction and includes an outer body 12 of bonded activated carbon particles having an annular cylindrical outer wall 13 defining a generally cylindrical open interior 14 which is filled with a particulate filter media bed 15. The particulate media bed may comprise any of a variety of filter media such as, for example, an ion exchange resin or a mixed bed of cation and anion exchange resins.

The filter cartridge 10 includes an outlet end cap 16 at one end and an enclosing end cap 17 at the opposite end. An annular sealing ring 18 is seated in a suitable recess 20 on the outside face of the enclosing end cap 17 and, when the filter cartridge is inserted into the housing 11, the sealing ring 18 is engaged by an annular sealing edge 21 in the bottom wall of the housing.

The outlet end cap 16 includes a centrally disposed hub 22 which defines an axially extending outlet opening 23. The outlet end cap 16 includes an integral end plate 24 having a flanged outer edge 25 adapted to fit snuggly over the end of the carbon body 12. The central hub 22 in the outlet end cap 16 includes an annular groove 26 adapted to receive and hold an O-ring 27.

As may be seen in FIG. 1, with the filter cartridge 10 inserted into the housing 11, a cover 30 is threaded onto the housing. The cover 30 includes a housing inlet 31 by which unfiltered raw water is directed to the filter cartridge 10 and a housing outlet 32 from which the filtered effluent water from the filter cartridge is directed for consumption or use. The cover 30 includes a cylindrical opening 33 which slides over the O-ring 27 on the central hub 22 as the cover 30 is threaded onto the housing 11. Simultaneously, the annular sealing ring 18 on the enclosing end cap 17 is pressed into engagement with the sealing edge 21 in the bottom wall of the housing. Unfiltered water entering the housing via the housing inlet passes into the space between the housing wall and the outside surface of the carbon body 12. The water then flows radially inwardly through the annular wall 13 of the carbon body, into the media bed 15 filling the hollow interior, and then axially through the media bed and through the filtered water outlet opening 23 in the end cap 16. The foregoing construction is generally known in the art and, without the unique flow distribution apparatus of the present invention, a significant portion of the flow of water would tend to pass through the porous carbon body 12 closely adjacent the outlet end cap 16, through the region where the resistance to flow is less. Obviously, the result would be less flow of water through the portions of the carbon body more remote from the outlet end cap and, correspondingly, lower flow through the portion of the media bed 15 more remote from the outlet end. However, simply diverting the flow of water to be filtered to the remote or bottom end of the media bed would shift the flow radially through the carbon body to that remote end and, as a result, an imbalance in radial flow along the entire axial length of the carbon body would remain.

In accordance with the preferred embodiment of the present invention, flow distribution means comprises a combination of a carbon body 12 having a radial flow capacity which varies axially along the length of the body and a barrier device 34 positioned axially along a portion of the interface between the carbon body 12 and the particulate media bed 15 to divert at least a portion of the radial flow of water through that part of the carbon body nearer the outlet end axially toward the opposite end of the media bed 15 which is remote from the outlet end. In this manner, short circuiting is prevented, a more even distribution of radial flow through the carbon body is attained, and contact of the water with the media bed 15 over substantially its full length is maximized.

The barrier device 34 preferably comprises a thin-walled cylindrical tubular sleeve 35 disposed between the carbon body 12 and the media bed 15 and extending from the outlet end cap 16 axially toward the enclosing end cap 17 on the opposite end of the cartridge. In the preferred embodiment, the tubular sleeve 35 terminates in an axially inner end 36 which is spaced from the remote end of the media bed 15. As shown in the drawing, the tubular sleeve 35 has a length somewhat in excess of one-half the length of the cartridge 10, but substantially less than the overall length thereof. Thus, between the end 36 of the sleeve and the enclosing end cap 17 of the cartridge, there is an area of direct open communication between the carbon body 12 and the media bed 15 for the free flow of water. In the preferred embodiment, the tubular sleeve 35 is impervious along its full length and has an outer surface which is spaced slightly from the interior cylindrical surface of the carbon body. This small space 37 is preferably provided by interposing a thin layer of porous material, such as a polypropylene wrap 38, between the sleeve 35 and the interior of the carbon body.

Figure 3:
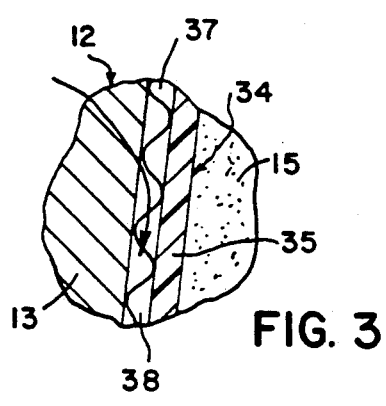
FIG. 3 is an enlarged detail of a portion of FIG. 2 showing the tubular flow distribution barrier at the interface between the carbon filter body and the particulate filter media.

As the water to be filtered passes radially through the carbon body 12 in the region adjacent the barrier device 34, it will come in contact with the impervious wall of the tubular sleeve 35, travel axially therealong (as best shown in FIG. 3) toward the remote closed end of the cartridge and into the media bed 15 near that remote end. From there the water is forced to flow in an axial direction through substantially the full length of the media bed and ultimately out through the outlet opening 23.

If a carbon body 12 having an outer wall 13 of uniform thickness and/or uniform porosity of the type commonly used in the prior art were utilized with the barrier device 34, the impervious tubular sleeve 35 would inhibit radial flow through the carbon body in the region along the sleeve, as compared to the open lower region extending from the end 36 of the sleeve to the lower end of the cartridge. To compensate for this inherent imbalance, the carbon body 12 is constructed to provide a radial flow capacity which varies axially along its length from a maximum adjacent the outlet end of the cartridge to a minimum adjacent the remote end at the bottom of the cartridge. In the embodiment shown in FIG. 2, the thickness of the wall 13 of the carbon body is uniform along its length, but the body is formed with a graduated or axially varying porosity which varies from a maximum porosity portion 45 at the inlet end to a minimum porosity portion 46 at the remote opposite end. When utilized in combination with the impervious tubular sleeve 35 the relative lower density (and higher porosity) of the minimum density portion 45 results in a substantially more balanced and uniform distribution of the radial flow of water through the carbon body 12 along its full length.

In a preferred construction, the outer surface of the carbon body 12 is provided with an inner wrap of a relatively fine polyolefin prefilter material 40 and an outer wrap of a more porous material such as a polypropylene wrap 41 similar to the interior polypropylene wrap 38, previously described. The polypropylene wrap 38 on the ID of the cylindrical carbon body preferably extends the full length thereof. These wrappings provide a prefiltering of larger particles from water entering the carbon block and help prevent particles shed from the surface thereof from entering the water. In addition, the inner polypropylene wrap 38 provides the necessary space 37 between tubular sleeve 35 and the interior of the carbon body 12.

In a variation of the filter cartridge shown in FIG. 2, the carbon body 47 of the cartridge shown in FIG. 4 is also provided with a radial flow capacity which varies axially along its length from a maximum at the outlet end to a minimum adjacent the remote end. However, the carbon body 47 is provided with a uniform porosity, but includes a uniform taper along its interior wall 51 to define a minimum wall thickness portion 48 at the outlet end and a maximum wall thickness portion 50 at the opposite remote end. Thus, the interior wall 51 departs from a true cylindrical shape and is frustoconical. The thinner minimum wall thickness section 48, of course, provides less resistance to flow than the opposite thicker end 50 and, therefore, would normally provide a region of preferential flow. However, as in the case of the FIG. 2 embodiment previously described, the FIG. 4 embodiment also utilizes the same barrier device 34 comprising the tubular sleeve 35. The combination of the tubular sleeve 35 with the thinner upper wall section of the carbon body 47 tends to balance the radial flow through the carbon body making it substantially equal along its axial length. Also as in the FIG. 2 embodiment, the tubular sleeve diverts a significant portion of the radial flow to the remote end of the cartridge, thereby maximizing axial flow through and contact with the media bed 15. Because of the frustoconical shape of the interior wall 51 of the carbon body 47, the space 52 between the wall and the outer surface of the tubular sleeve 34 tapers from a maximum adjacent the outlet end to a minimum at the end 36 of the sleeve 35. This space may be filled with any suitable high porosity material or the interior wall 51 of the carbon body may be provided with a single layer polypropylene wrap 38 of the type utilized in the FIG. 2 embodiment with a portion of the space 52 simply left open.

Figure 6:
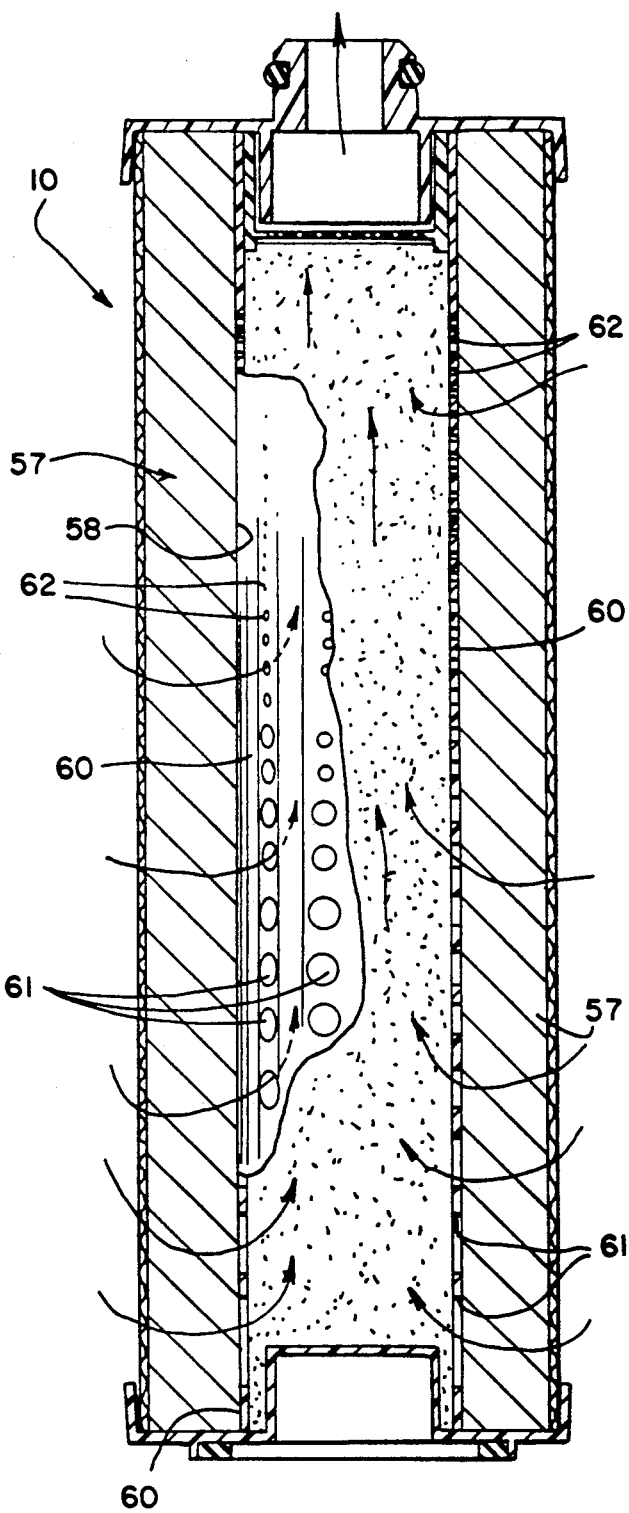
FIG. 6 is a view similar to FIG. 5 showing a variation in the filter cartridge.

FIGS. 5 and 6 show somewhat simplified versions of the filter cartridge of the present invention that are also constructed to provide a balanced flow, but are somewhat less effective than the preferred embodiments of FIGS. 2 and 4. The overall construction of the embodiment shown in FIG. 5 is generally similar to the previous embodiments. The main difference is in the shape or orientation of the carbon body 53 and the elimination of the barrier device 34 in the interface between the carbon body and the media bed 15. In this embodiment, the flow distribution means is provided by the carbon body itself which is constructed with a radial flow capacity which varies axially along its length from a minimum adjacent the outlet end to a maximum adjacent the opposite remote end. It will be recognized that this orientation is exactly opposite that of the carbon body 47 in the FIG. 4 embodiment. Thus, the carbon body 53 in FIG. 5 has an interior wall 54 which is frustoconical and converges toward the upper outlet end of the cartridge to define a minimum wall thickness end 55 at the lower end remote from the outlet and a maximum wall thickness end 56 at the upper end adjacent the outlet. The minimum wall thickness end 55 provides substantially less resistant to the radial flow of water and will, therefore, tend to balance the short circuiting flow through the upper outlet end, resulting in a greater volume of water also passing axially through substantially the full length of the media bed 15 as well as a balance in the flow. Without the barrier device 34 of the preferred embodiment, there will be some unavoidable short circuiting of flow through the maximum wall thickness end 56 which flow then may not be exposed to adequate contact time with the corresponding short length of media bed 15, as previously discussed. However, this embodiment still provides a similar balance in radial flow through the carbon body 53 along its full length as in the previously described embodiments. When used in certain applications, the cartridge shown in FIG. 5 is believed to be particularly effective in providing full utilization of both filter media, as in the following example. If the water or other liquid to be filtered has a relatively high sediment content (not unusual for many municipal supplies), the flow through the lower minimum wall thickness end 55 of the carbon body 53 will result in the pores in that part of the body becoming filled with sediment and plugged first. An increasing volume of radial flow through the body will progress axially toward the maximum wall thickness end 56 as the thinner opposite end regions become filled, thereby effectively utilizing the full axial length of the carbon body. As may be seen, however, as the major portion of radial flow through the carbon body progresses toward the outlet end, less length of media bed 15 is available to provide its separate filtering or removal function. However, because the thickness of the wall of the carbon body 53 is increasing with this axial migration in flow, a greater volume of activated carbon becomes available to enhance its filtering and adsorption functions. It is anticipated that the taper provided to the interior wall 54 of the carbon body 53 would be somewhat more radical than the corresponding inverse taper of the carbon body 47 in the FIG. 4 embodiment.

In a variation of the FIG. 5 construction, the carbon body could be utilized which is virtually identical to the carbon body 12 of the preferred FIG. 2 construction. Thus, the variation in radial flow capacity through the carbon body which varies axially along its length from an outlet end minimum to a maximum at the opposite end (as in the FIG. 5 construction) may be provided with a carbon body having a graduated (axially varying) porosity and oriented just opposite the body 12 in FIG. 2. In this variation, the minimum porosity portion would be located adjacent the outlet and the maximum porosity portion adjacent the opposite remote end. The flow characteristics of the carbon body would otherwise be the same as described with respect to the FIG. 5 embodiment.

FIG. 6 shows yet another variation in a flow distribution means comprising a single element. In this cartridge, the carbon body 57 is of completely conventional construction with a uniform cylindrical interior wall 58 and uniform porosity along its entire length. A flow distribution tube 60 is disposed along the interface between the interior wall 58 of the carbon body and the media bed 15. The tube 60 is provided with a uniformly varying porosity along its length which varies from a minimum adjacent the outlet end to a maximum adjacent the opposite lower end. In this manner, as in the embodiments of FIG. 5, the larger radial flow capacity through the carbon body 57 nearer the lower remote end helps counter the inherent short circuiting of flow through the upper outlet end. As shown in FIG. 6, the axially varying porosity in the flow distribution tube 60 is provided by a series of holes which progress from a large diameter size 61 at the remote lower end of the carbon body and media bed to a small diameter size 62 adjacent the upper outlet end of the cartridge. As previously described, this embodiment of the flow distribution means also creates a better balance in flow through the carbon body 57, thereby maximizing effective use of the carbon filter and the media bed 15. The upper small diameter holes 62 may be sized and spaced to substantially prevent any substantial radial flow through the carbon body in this region, but to allow continuously greater flow as the lower regions of the carbon body become increasingly clogged, as with entrained sediment or the like.

Figure 7:
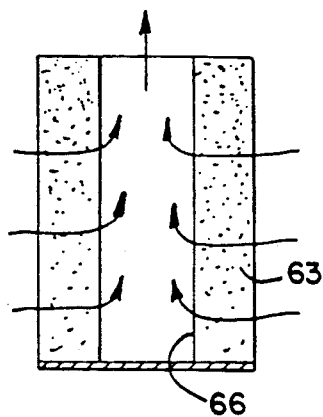
FIGS. 7-9 are schematic cross sectional views of rigid porous filter bodies constructed to provide balanced flow in accordance with the present invention.
Figure 8:
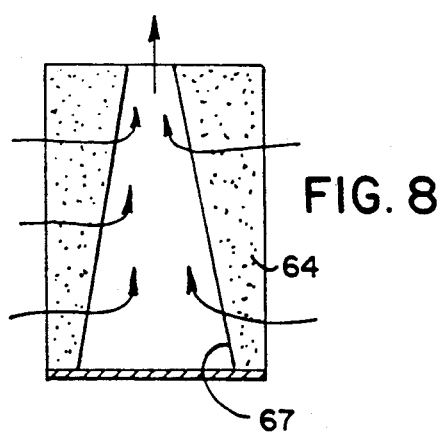
Figure 9:
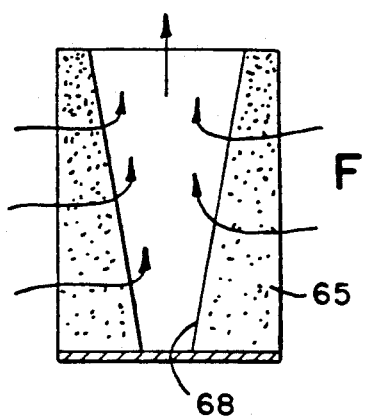

FIGS. 7-9 show schematic representations of filter bodies constructed to provide a balanced radial flow through the body along its full axial length. Each of the filter bodies 63-65 may be made of resin-bonded activated carbon particles or of any other porous filter media which can be formed into a substantially self-supporting body defining a cylindrical shape with a hollow interior. Further, the hollow interior portions 66-68, respectively, may be left open or filled with a particulate filter media or some other type of liquid treatment mechanism. Filter bodies 63 and 64 are intended to function in the same manner as the graduated porosity and tapered constructions 12 and 47 described with respect to the preferred embodiments of the invention. The body 65 of the FIG. 9 filter incorporates a composite of the construction of the filter bodies of FIGS. 7 and 8 by utilizing both a graduated porosity and a tapered hollow interior 68. This is only one example of a composite construction which, with appropriate changes in media size, density of compaction and taper angle, could be provided with a construction opposite that shown, but still providing the desired balance in radial flow along the axial length of the body.

Various modes of carrying out the present invention are contemplated as being within the scope of the following claims particularly pointing out and distinctly claiming the subject matter which is regarded as the invention.

We claim:

1. In a filter cartridge including a self-supporting body of a porous filter material having a cylindrical outer wall and a hollow interior with an axial open end and an opposite closed remote end, said cartridge disposed within a housing and positioned to allow the passage of a fluid to be treated inwardly through the cylindrical outer wall in a generally radial direction, and axially along the hollow interior to a filtered fluid outlet in the open end, the improvement comprising:

flow distribution means extending axially along the filter body for distributing the flow of fluid through the filter body axially along substantially the full length thereof and, wherein said flow distribution means comprises means formed integrally with said filter body for providing said filter body with a radial flow capacity which varies axially along the length of the body from a minimum adjacent the outlet end to a maximum adjacent the remote end.

2. The apparatus as set forth in claim 1 wherein the means for providing the axially varying radial flow capacity comprises said filter body having an axially varying porosity which provides said body with a minimum porosity adjacent said outlet end and a maximum porosity adjacent said remote end.

3. The apparatus as set forth in claim 1 wherein the means for providing the axially varying radial flow capacity comprises a radial inner wall defining the hollow interior of said filter body having a shape which is axially divergent in the direction of said remote end.

4. The apparatus as set forth in claim 3 wherein the shape of the radial inner wall of said filter body is frustoconical.

5. In a filter cartridge for fluid treatment including a body of bonded activated carbon particles having a cylindrical outer wall and a hollow interior with an axial open end and an opposite closed remote end, said cartridge disposed within a housing and positioned to allow the passage of the fluid to be treated inwardly through the cylindrical outer wall in a generally radial direction, and axially along the hollow interior to a filtered fluid outlet in the open end, the improvement comprising:

flow distribution means extending axially along the carbon body for distributing the radial flow of fluid uniformly and equally through the carbon body axially along substantially the full length thereof, thereby maximizing the capacity of the filter body and minimizing the short circuiting through the filtered fluid outlet; and, wherein said flow distribution means comprises means formed as an integral part of said carbon body for providing said carbon body with radial flow capacity which varies axially along the length of the body from a minimum adjacent the outlet end to a maximum adjacent the remote end.

6. The apparatus as set forth in claim 5 wherein the means for providing the axially varying radial flow capacity comprises said carbon body having a graduated porosity which provides said body with a minimum porosity adjacent said outlet end and a maximum porosity adjacent said remote end.

7. The apparatus as set forth in claim 5 wherein the means for providing the axially varying radial flow capacity comprises a radial inner wall defining the hollow interior of said carbon body having a frustoconical shape which is axially divergent in the direction of said remote end.

8. In a filter cartridge including a body of bonded activated carbon particles having a cylindrical outer wall and a hollow interior with an axial open end and an opposite closed remote end, and a particulate filter media bed filling the hollowing interior, said cartridge disposed within a housing and positioned to allow the passage of a fluid to be treated inwardly through the cylindrical outer wall in a generally radial direction, into the interior media bed, and axially through the media bed to a filtered fluid outlet in the open end, the improvement comprising:

flow distribution means extending axially along the carbon body for distributing a greater portion of the flow of fluid after passing initially through the carbon body axially toward the end of the filter media bed remote from the open end, whereby contact between the fluid and both the carbon body and media bed is substantially balanced and maximized; and, wherein said flow distribution means comprises means formed as an integral part of said carbon body for providing said carbon body with a radial flow capacity which varies axially along the length of the body from a maximum adjacent the outlet end to a maximum adjacent the remote end.

9. The apparatus as set forth in claim 8 wherein the means for providing the axially varying radial flow capacity comprises said carbon body having a graduated porosity which provides said body with a minimum porosity adjacent said outlet end and a maximum porosity adjacent said remote end.

10. The apparatus as set forth in claim 8 wherein the means for providing the axially varying radial flow capacity comprises a radial inner wall defining the hollow interior of said carbon body having a frustoconical shape which is axially divergent in the direction of said remote end.

11. In a filter cartridge including a self-supporting body of a porous filter material having a cylindrical outer wall and a hollow generally cylindrical interior with an axial open end, and a particulate filter media bed filling the hollow interior, said cartridge disposed within housing and positioned to allow the passage of a fluid to be treated inwardly through the cylindrical outer wall in a generally radial direction, into the interior media bed, and axially through the media bed to a filtered fluid outlet in the open end, the improvement comprising:

flow distribution means defining at least a portion of the interface between the filter body and the particulate filter media for distributing the radial flow of fluid through the filter body substantially equally along its length, said flow distribution means including barrier means for preventing direct passage of at least a portion of the flow of fluid after passage initially through the filter body into said media bed adjacent the open end and means for directing said portion of the flow axially along said barrier means toward the end of the filter media bed remote from the open end, whereby contact between the fluid and the filter body and media bed is substantially balanced and maximized.

12. The apparatus as set forth in claim 11 wherein said flow distribution means comprises:
   means for providing said filter body with a radial flow capacity which varies axially along the length of the body from a maximum adjacent the outlet end to a minimum adjacent the remote end; and,
   a cylindrical tubular barrier surrounding a portion of the media bed and extending axially from eh open end of the filter body and terminating in an opposite end portion defining an open area adjacent the remote end of the media bed, and highly previous spacer means defining a substantially open space between said barrier and the interior surface of the filter body.

13. The apparatus as set forth in claim 12 wherein the opposite end portion of said tubular barrier terminates spaced from the remote end of said media bed.

14. The apparatus as set forth in claim 13 wherein said tubular barrier has an axial length in excess of one-half the length of the filter body and media bed.

15. The apparatus as set forth in claim 13 wherein said tubular barrier is impervious.

16. The apparatus as set forth in claim 13 comprising a highly porous medium filling said open space between the outer surface of the tubular barrier and the interior surface of said filter body.

17. The apparatus as set forth in claim 13 wherein said filter body comprises a body of bonded activated carbon particles.

18. The apparatus as set forth in claim 17 wherein the means for providing the axially varying radial flow capacity comprises said carbon body having a graduated porosity which provides said body with a maximum porosity adjacent said outlet and a minimum porosity adjacent said remote end.

19. The apparatus as set forth in claim 17 wherein the means for providing the axially varying radial flow capacity comprises a radially inner wall defining the hollow interior of said carbon body, said inner wall having a frustoconical shape which is axially convergent in the direction of said remote end.

20. In a filter cartridge including a self-supporting body of a porous filter material having a cylindrical outer wall and a hollow interior with an axial open end and an opposite closed remote end, said cartridge disposed within a housing and positioned to allow the passage of a fluid to be treated inwardly through the cylindrical outer wall in a generally radial direction, and axially along the hollow interior to a filtered fluid outlet in the open end, the improvement comprising:
   flow distribution means extending axially along the hollow interior of the filter body for distributing the flow of fluid through the filter body axially along substantially the full length thereof; and,
   wherein said flow distribution means comprises a cylindrical tubular member in contact with the filter body and with the surface of the tubular member extending generally normal to the direction of radial flow through said body, said tubular member extending axially from the open end of the filter body to an opposite end adjacent the remote end of the filter body, said tubular member having a uniformly varying porosity along its length which increases progressively from a minimum adjacent the outlet to a maximum adjacent the remote end.

21. The apparatus as set forth in claim 20 wherein said tubular member includes a pattern of radial through holes along its length.

22. The apparatus as set forth in claim 21 wherein the opposite end of said tubular member extends to the remote end.

23. The apparatus as set forth in claim 21 wherein the opposite end of said tubular member is spaced from the remote end.

24. In a filter cartridge for fluid treatment including a body of bonded activated carbon particles having a cylindrical outer wall and a hollow interior with an axial open end and an opposite closed remote end, said cartridge disposed within a housing and positioned to allow the passage of the fluid to be treated inwardly through the cylindrical outer wall in a generally radial direction, and axially along the hollow interior to a filtered fluid outlet in the open end, the improvement comprising:
   flow distribution means extending axially along the carbon body for distributing the radial flow of fluid uniformly and equally through the carbon body axially along substantially the full length thereof, thereby maximizing the capacity of the filter body and minimizing the short circuiting through the filtered fluid outlet; and,
   wherein said flow distribution means comprises a cylindrical tubular member lying adjacent the hollow interior of the carbon body, said tubular member extending axially from the open end of the carbon body to an opposite end adjacent the remote end of the carbon body, said tubular member having a uniformly varying porosity along its length which increases progressively from a minimum adjacent the outlet to a maximum adjacent the remote end.

25. The apparatus as set forth inn claim 24 wherein said tubular member includes a pattern of radial through holes along its length.

26. The apparatus as set forth in claim 25 wherein the opposite end of said tubular member extends to the remote end.

27. The apparatus as set forth in claim 25 wherein the opposite end of said tubular member is spaced from the remote end.

28. In a filter cartridge including a body of bonded activated carbon particles having a cylindrical outer wall and a hollow interior with an axial open end and an opposite closed remote end, and a particulate filter media bed filling the hollow interior, said cartridge disposed within a hosing and positioned to allow the passage of a fluid to be treated inwardly through the cylindrical outer wall in a generally radial direction, into the interior media bed, and axially through the media bed to a filtered fluid outlet in the open end, the improvement comprising:
   flow distribution means extending axially along the carbon body for distributing a greater portion of the flow of fluid after passing initially through the carbon body axially toward the end of the filter media bed remote from the open end, whereby contact between the fluid and both the carbon body and media bed is substantially balanced and maximized; and,
   wherein said flow distribution means comprises a cylindrical tubular member defining the interface between the carbon body and the media bed, said tubular member extending axially from the open end of the carbon body to an opposite end adjacent the remote end of the media bed, said tubular member having a uniformly varying porosity along its length which increases progressively from a minimum adjacent the outlet to a maximum adjacent the remote end.

29. The apparatus as set forth in claim 28 wherein said tubular member includes a pattern of radial through holes along its length.

30. The apparatus as set forth in claim 29 wherein the opposite end of said tubular member extends to the remote end.

31. The apparatus as set forth in claim 29 wherein the opposite end of said tubular member is spaced from the remote end.

* * * * *

UNITED STATES PATENT AND TRADEMARK OFFICE
CERTIFICATE OF CORRECTION

PATENT NO.  : 5,106,501
DATED       : April 21, 1992
INVENTOR(S) : Vue X. Yang et al It is certified that error appears in the above-identified patent and that said Letters Patent is hereby corrected as shown below:

Claim 8, column 10, line 30, delete "maximum" and substitute therefor --minimum--.

Claim 11, column 10, line 49, after "within" insert --a--.

Claim 12, column 11, line 8, delete "eh" and substitute therefor --the--.

Claim 25, column 12, line 37, delete "inn" and substitute therefor --in--.

Claim 28, column 12, line 51, delete "hosing" and substitute therefor --housing--.

Signed and Sealed this

Twenty-second Day of June, 1993

Attest:

MICHAEL K. KIRK

*Attesting Officer*    Acting Commissioner of Patents and Trademarks